(12) United States Patent
Huang et al.

(10) Patent No.: US 7,116,643 B2
(45) Date of Patent: Oct. 3, 2006

(54) METHOD AND SYSTEM FOR DATA IN A COLLECTION AND ROUTE DISCOVERY COMMUNICATION NETWORK

(75) Inventors: Jian Huang, Coral Springs, FL (US); Robert J. O'Dea, Ft. Lauderdale, FL (US)

(73) Assignee: Motorola, Inc., Schaumburg, IL (US)

( * ) Notice: Subject to any disclaimer, the term of this patent is extended or adjusted under 35 U.S.C. 154(b) by 1012 days.

(21) Appl. No.: 10/135,609

(22) Filed: Apr. 30, 2002

(65) Prior Publication Data

US 2003/0202479 A1    Oct. 30, 2003

(51) Int. Cl.
*H04L 12/28* (2006.01)
(52) U.S. Cl. .................... 370/255; 370/252; 370/254
(58) Field of Classification Search ............. 370/252, 370/254–256, 328, 338, 432, 389
See application file for complete search history.

(56) References Cited

U.S. PATENT DOCUMENTS

| | | | |
|---|---|---|---|
| 4,947,390 A * | 8/1990 | Sheehy | 370/401 |
| 5,490,139 A | 2/1996 | Baker et al. | |
| 5,576,972 A * | 11/1996 | Harrison | 702/128 |
| 5,612,957 A * | 3/1997 | Gregerson et al. | 370/401 |
| 6,160,477 A | 12/2000 | Sandelman et al. | |
| 6,304,556 B1 * | 10/2001 | Haas | 370/254 |
| 6,326,918 B1 | 12/2001 | Stewart | |
| 6,535,498 B1 * | 3/2003 | Larsson et al. | 370/338 |
| 6,954,435 B1 * | 10/2005 | Billhartz et al. | 370/252 |
| 2002/0161751 A1 * | 10/2002 | Mulgund et al. | 707/3 |
| 2003/0095042 A1 * | 5/2003 | Ebata et al. | 340/506 |
| 2003/0117966 A1 * | 6/2003 | Chen | 370/255 |
| 2004/0160913 A1 * | 8/2004 | Kubler et al. | 370/328 |
| 2005/0105475 A1 * | 5/2005 | Norrgard et al. | 370/254 |

OTHER PUBLICATIONS

"A New Dynamic Distributed Routing Algorithm on Telecommunication Networks" by Lianyan Li, Zemin Liu and Zheng Zhou, Beijing University of Posts and Telecommunications, 2000 IEEE, pp. 849-852.

"Ant Colony Optimization for Multicast Routing", by Ying Wang Jianying Zie, Institute of Automation, Shanghai Jiatong University, 2000 IEEE, pp. 54-57.

* cited by examiner

Primary Examiner—Chirag Shah

(57) ABSTRACT

A communication system provides for data collection and route discovery for a network of distributed nodes. A base code having a data collection function occasionally sends agent packets to selected nodes of the network (620), and these nodes in turn route the agent packets to other nodes. A route suitability level is maintained for each node that reflects the suitability of that node for routing packets to the base node (5 10). At least some data packets contain reporting criteria for particular nodes (620). When a condition exists at a node that meets the reporting criteria, a selected packet is updated with reporting data, and routed toward the based node via a neighbor node based on the route suitability level of the neighbor node (550,552,555).

23 Claims, 4 Drawing Sheets

| DESTINATION | 210 |
| --- | --- |
| STATUS INFORMATION | 220 |
| TIME TO LIVE INFORMATION | 230 |
| REPORTING CRITERIA | 240 |
| REPORTING DATA | 250 |
| SELF-EXTRACTING OPERATIONAL SOFTWARE | 260 |

METHOD AND SYSTEM FOR DATA IN A COLLECTION AND ROUTE DISCOVERY COMMUNICATION NETWORK

FIELD OF THE INVENTION

The present invention relates generally to communication networks and more specifically to message routing and route discovery suitable for sensor networks and other communication networks.

BACKGROUND OF THE INVENTION

Communication networks generally have messages that are routed among distributed network devices or nodes according to a governing network protocol. The establishment and maintenance of communication routes within a network is an essential part of network management. Various methods have been used for route management depending on network design. In a typical application, routing equipment is placed at key transition points within the network, and such equipment operated according to a set of rules that govern the forwarding of messages from one network device to another. Routing algorithms executed at the routing equipment determine the appropriate paths. The routes, sometimes represented by routing tables, may be established at network setup time, or may be dynamically established through various route discovery techniques.

Ad-hoc networks of wireless devices have been gaining in popularity for certain applications. In an ad-hoc network, the number of nodes, and the communication links among the nodes, may change frequently. Generally, the ad-hoc network is designed to accommodate such dynamic reconfiguration by adjusting communication routes as needed. Some ad-hoc networks are self-organized and have no centralized infrastructure or control mechanism. As a result, there are certain cost, reliability, and robustness advantages that would be inherent in an ad-hoc network, provided that a suitable route management mechanism is available.

A sensor network is one type of network that could benefit from an ad-hoc network design. In a sensor network, sensing devices are distributed about an environment in which monitoring is required. These devices detect or measure some parameter of interest, and report the collected data to one or more reporting stations or collection nodes. An ad-hoc sensor network with a suitable routing mechanism could allow for the collection and reporting of data in a highly reliable and efficient manner. Certain routing mechanisms are known in the art but do not provide an adequate solution for all sensor applications. One example is given in U.S. Pat. No. 6,304,556 issued to Haas on Oct. 16, 2001, and entitled "ROUTING AND MOBILITY MANAGEMENT PROTOCOLS FOR AD-HOC NETWORKS". Here, the network is divided into overlapping routing zones, and each node is required to know the topology of the network within its routing zone. Route discovery inquiries are limited to those nodes located on the periphery of routing zones in an attempt to reduce overhead. However, a significant amount of overhead still remains in the route discovery process. Another example is described in U.S. Pat. No. 5,490,139 issued to Baker et al., on Feb. 6, 1996, and entitled "MOBILITY ENABLING ACCESS POINT ARCHTECTURE FOR WIRELESS ATTACHMENT TO SOURCE ROUTING NETWORKS". Here, a token ring network is used as a means of transporting packets. Usually, a route discovered for every destination is stored in local memory and used for every packet that is sent to that destination. However, such routing mechanism requires the availability of a large amount of processing and memory resources.

Recently, there have been attempts to develop routing algorithms for telecommunication networks using Ant Colony Optimization (ACO) heuristics. One such approach is described in a paper entitled "A NEW DYNAMIC DISTRIBUTED ROUTING ALGORITHM ON TELECOMMNICATION NETWORKS" published by Lianyan Li, Zemin Liu and Zheng Zhou in the Institute of Electrical and Electronics Engineers (IEEE) Communication Technology Proceedings, WCC-ICCT 2000. In this approach, pheromone tables, which are tables of probabilities, replace traditional routing tables. To update the tables, agents, intended to model the behavior of ants, are launched from every node in the network at each time step, and at launch time, each agent is assigned a random destination node. At a particular node, the agent selects the next node on the route according to a particular probability algorithm. The agent records every node that it passes, and if the node reaches its destination, the pheromone tables at the nodes that the agent has visited are updated. After the update of the pheromone tables, more agents will select the shorter routes or travel along paths with better load conditions. In another paper published by Ying Wang and Jianying Xie, at the 2000 IEEE APCCAS Conference, and entitled "ANT COLONY OPTIMIZATION FOR MULTICAST ROUTING", a multicast routing algorithm is proposed that purports to shown improved effectiveness and capability of parallel implementation.

While prior art techniques, including ant colony modeling, may be applicable to routing problems in communication networks, the techniques have not been adequately developed to satisfactorily address data collection and routing requirements present in sensor networks and many other types of communication networks. Accordingly, a new approach to route discovery and data collection in networks is needed.

BRIEF DESCRIPTION OF THE DRAWINGS

Objects and advantages of the present invention will be more readily apparent from the following detailed description of preferred embodiments thereof when taken together with the accompanying drawings in which.

DETAILED DESCRIPTION OF THE PREFERRED EMBODIMENTS

While the above description is of the preferred embodiment of the present invention, it should be appreciated that the invention may be modified, altered, or varied without deviating from the scope and fair meaning of the following claims.

The present invention provides a method and system for collecting and routing data in a communication network consisting of interlinked communication devices, such as a network of distributed sensor devices. In the network, a base node, having a data collection function, occasionally sends agent packets configured in a roaming state to selected nodes of the network. A route suitability level is maintained for each node to reflect the suitability of the particular node for routing packets toward the base node. In response to the receipt of an agent packet by a particular node, the contents of the packet are accessed to determine the required action. In a first mode, the agent packet contains data destined for the base node, and the packet is forwarded to a neighboring node selected based on the route suitability level associated with that node. In addition, the route suitability level of the particular node is updated to reflect usage of that node as a route toward the base node. In a second mode, the agent packet contents indicate predetermined reporting criteria for one or more local conditions. If a local condition exists at the particular node that meets a predetermined reporting criteria, the agent packet is updated with corresponding reporting data and forwarded toward the base node via a neighboring node selected based on a route suitability level. In a third mode, the agent packet contents indicate that the agent packet is in a roaming state, and the particular node determines that the agent packet should continue in a roaming state. In such cases, the particular node forwards the agent packet to a neighboring node selected at random or by some other algorithm.

Figures 1, 2:
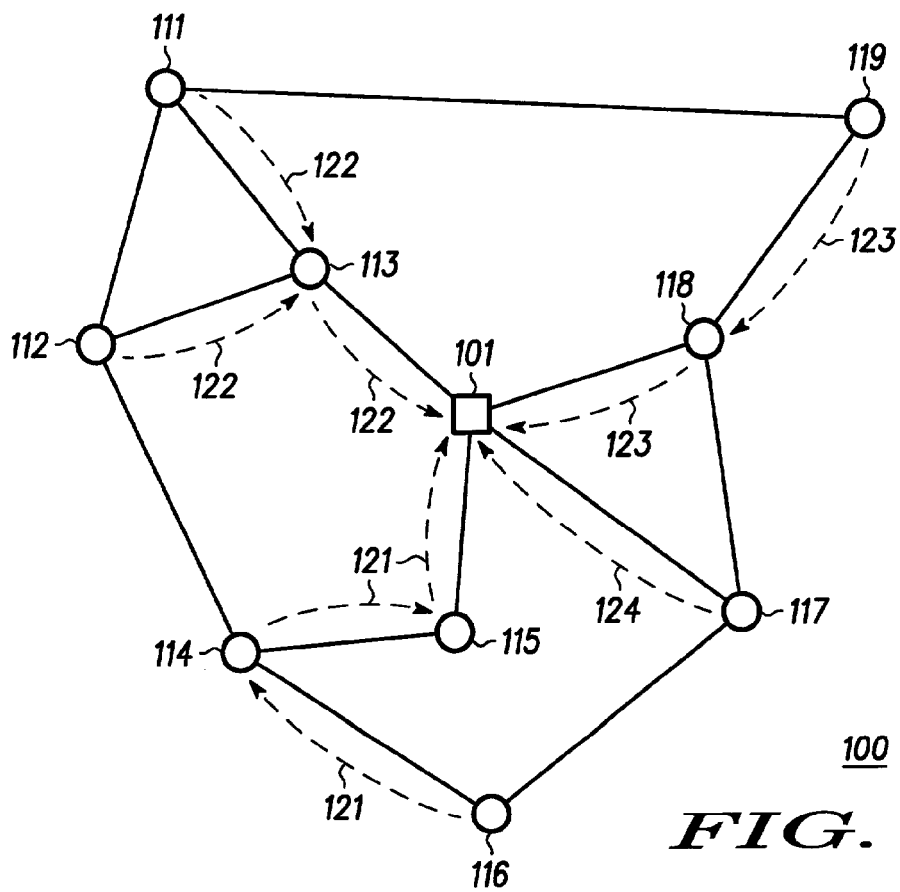
FIG. 1 is a diagram of a wireless sensor network, in accordance with the present invention.
FIG. 2 shows a block diagram of an agent packet, in accordance with the present invention.

FIG. 1 is a shows a representative communication network 100, in accordance with the present invention. The communication network 100 of the preferred embodiment is an ad-hoc sensor network having several sensor nodes 111–119 distributed over a geographically dispersed area, and a base node or collection node 101 for aggregating data collected at the sensor nodes 111–119. Note that although a sensor network shown, the present invention is applicable to many different types of networks, particularly where data must be collected from various distributed nodes. The nodes 101, 111–119 include wireless communication modules, and are capable of establishing communication links so as to communicate among themselves in a peer-to-peer manner. Each node 101, 111–119 also has memory and computing capability. As shown, the nodes of the network have self-organized, and exhibit network redundancy in their communication links. However, the network further exhibits preferred communication routes or paths 121, 122, 123, 124 from the various sensor nodes to the base node. The present invention provides for the establishment and maintenance of such routes, and for the transfer of data from the sensor nodes to the base node via the preferred routes. The data transfer is preferably accomplished using agent packets or active packets defined as intelligent message modules or agents that can carry software and data together that together specify operating instructions and reporting criteria, reporting data, status, destination, and the like.

The route discovery and data transfer method of the present invention can be more easily understood by considering the behavior of ants in an ant colony environment. The base node or data collection node can be modeled as the "HOME" site from which "ANTS" are sent roaming in search of "FOOD". The agent packet, described in more detail below, models the "ANTS" in search of "FOOD". The "FOOD" can be represented as reporting data, and include information such as environmental parameters monitored by sensing devices. The nodes represent potential "FOOD SITES" when there is reporting data at these nodes, such as occurs when the values of monitored parameters exceed predetermined thresholds. The route suitability level maintained at each node can be modeled as "PHEROMONE" used by "ANTS" to mark trails toward "HOME" and to attract other "ANTS" toward "FOOD SITES". As such, the terms "pheromone" and "route suitability level", "ants" and "agent packets", and "food" and "reporting data" may be used herein interchangeably to describe the invention. Note that the ant colony model represents a loose approximation for a general understanding of the behavior of the network of the preferred embodiment, and that the actual invention is not defined or limited by such modeling.

FIG. 2 shows a block diagram of an agent packet, in accordance with the present invention. The agent packet of the preferred embodiment is used by the network for route discovery, route maintenance, and for querying and receiving data from sensor nodes. As such, the agent packet includes one or more pieces of software and/or data related to destination 210, status 220, time to live 230, reporting criteria 240, reporting data 250, and self-extracting operational software 260. The destination 210 specifies whether the agent packet is destined for a base node, a particular sensor node, a sensor node meeting particular criteria, or the destination may specify no particular node. The status 220 reflects whether the agent packet is in a roaming, search, or carry state. When in a roaming state, the agent packet has no reporting data but may have reporting criteria specified. When in a search state, the agent packet is en route to a particular node having reporting data. When in a carry state, the agent packet has reporting data destined for the base node. The time to live information 230 is used in determining when to terminate the life of the agent packet. The reporting criteria is used as a triggering mechanism for reporting local conditions or other monitored parameters, and is preferably in the form of threshold values. Reporting data 250 is data stored in the agent packet by nodes when the reporting criterion is met, such as specified by the reporting criteria 240. The self-extracting or other software instructions 260 contained in the agent packet governs the behavior of the nodes with respect to the agent packet. The inclusion of software instructions in the agent packet enhances the flexibility and configurability of the network.

Figure 3:
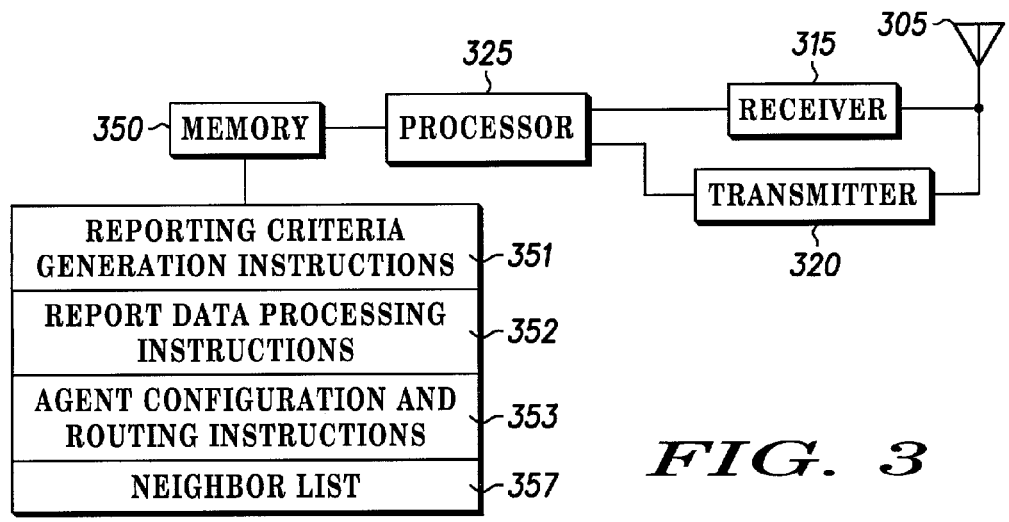
FIG. 3 shows a block diagram of a base node communication device, in accordance with the present invention.

FIG. 3 shows a block diagram of a communication device 300 operable as a base node, in accordance with the present invention. In the base node, a processor 325 governs the overall device function such as data collection and agent packet management. A receiver 315 coupled to the processor 325 receives incoming messages via an antenna 305 and provides these messages to the processor 325. A transmitter 320, coupled to the processor 325, provides the capability of transmitting data pertaining to device function or other communication requirements as needed. A memory module 350 stores operating instructions and data for the device. Specifically, the memory 350 includes operating instructions for generating reporting criteria 351, for processing reporting data 352, and for configuring and routing agent packets 353, among others. The procedures and steps implemented by the various operating instructions 351,252,253 of the base node are described below. The base node 300 further includes a neighbor list 357 have any information on network devices or nodes that are within communication range of the base node.

Figure 4:
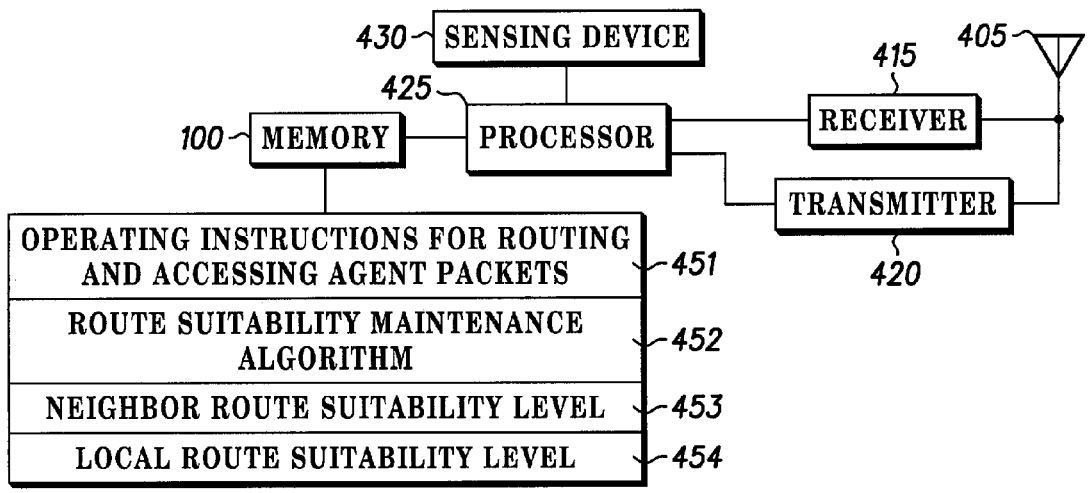
FIG. 4 shows a block diagram of a sensor node communication device, in accordance with the present invention.

FIG. 4 shows a block diagram of a communication device 400 operable as a sensor node, in accordance with the present invention. In the sensor node, a processor 425 governs the overall device function such as data collection and agent packet management. A receiver 415 coupled to the processor 425 receives incoming messages via an antenna 405 and provides these messages to the processor 425. A transmitter 420, coupled to the processor 425, provides the capability of transmitting data pertaining to device function or other communication requirements as needed. A sensing device 430 is coupled to the processor 425 and operates to measure one or more environmental parameters. A memory module 450 stores operating instructions and data for the device. Specifically, the memory includes operating instructions and data for routing and accessing agent packets and for extracting and executing software and data contained in agent packets 451, for executing a route suitability maintenance algorithm 452. The memory also has route suitability levels and other information for neighbor nodes 453, and a local route suitability level 454, and associated instructions obtaining and maintaining such information. The route suitability level is preferably a compound value consisting of a home bias component representing the suitability for routing a packet toward the base node; a search bias component representing the proximity of another node having reporting data; and a general bias component that represents a dilution factor caused by diffusion and evaporation. The operating instructions for routing agent packets, including instructions for routing the agent packet to a neighbor node selected based on a route suitability level associated with a neighbor node when the agent packet contains data destined for the base node; for routing the agent packet to a neighbor node selected when the agent packet is in a roaming state and the route suitability level associated with a neighbor node is above a certain threshold; and for routing the agent packet to a neighbor node selected at random when the agent packet is in a roaming state and the route suitability levels associated with particular neighbor nodes are below a certain threshold. The operating instructions for accessing agent packets include instructions for executing and extracting software and data contained in an agent packet, and for determining whether a local condition exist that meet a reporting criteria defined at least in part by the software and data. The operating instructions for maintaining the local route suitability level include instructions for increasing the local route suitability level upon performing a routing operation, and for decreasing the local route suitability level according to an algorithm incorporating a local evaporation rate and a local diffusion rate. The procedures and steps implemented by the various operating instructions and data 451, 452, 453, 454 of the sensor node are described below.

Figure 5:
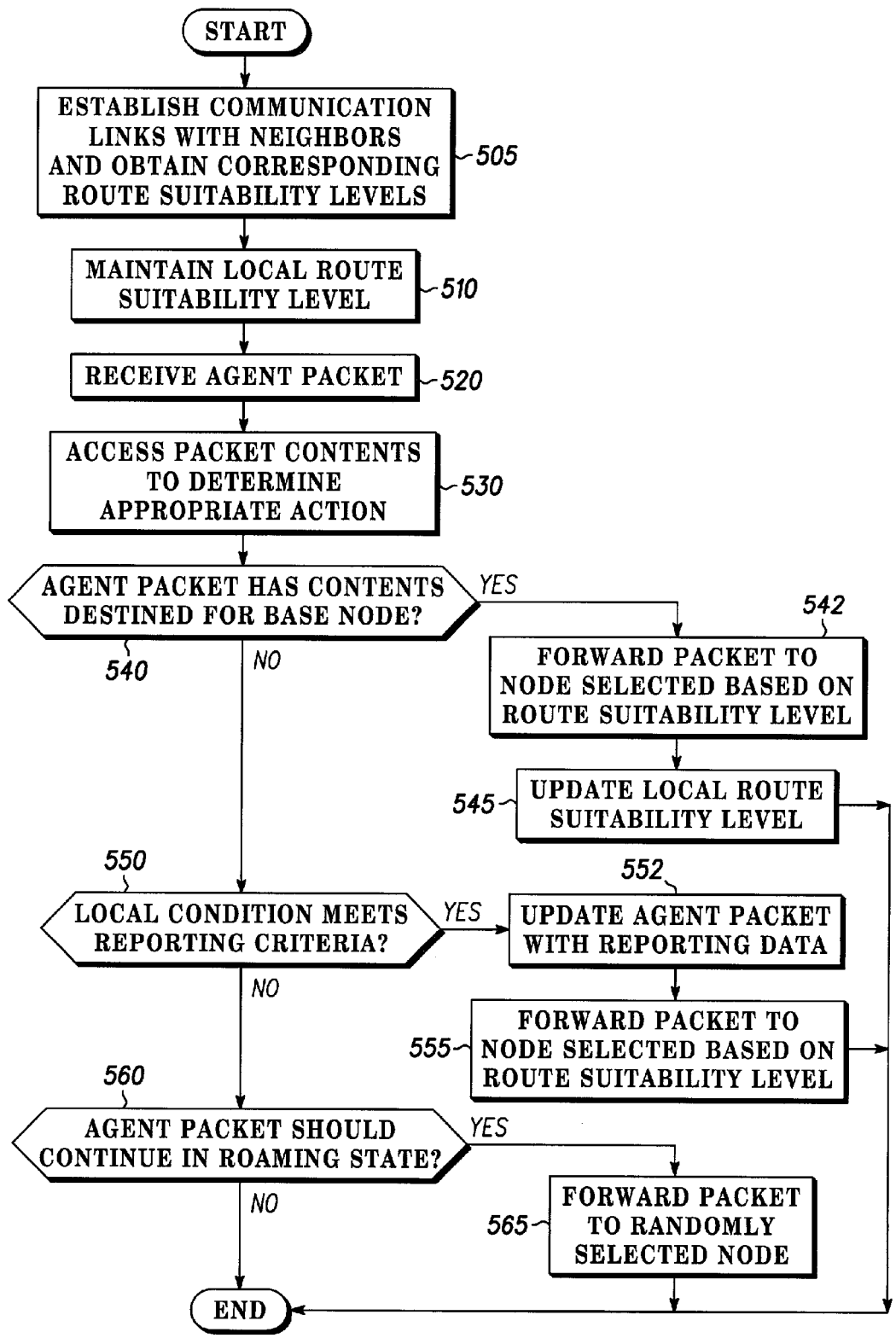
FIG. 5 shows a flowchart of procedures used for operation of a sensor node, in accordance with the present invention.

FIG. 5 shows a flowchart of procedures used for operation of a sensor node, in accordance with the present invention. The instant sensor node establishes communication links with neighbor nodes of the network, and obtains information on its neighbor nodes, including route suitability or pheromone levels for such nodes, step 505. The sensor node also maintains at the sensor node a pheromone level that is occasionally updated to reflect suitability of that node for routing packets toward the base node, step 510. Preferably, in the process of maintaining the pheromone level, a combination of algorithms are applied, including an evaporation algorithm for reducing the pheromone level over time according to a local evaporation rate, and a diffusion algorithm to decrease the pheromone level based on the pheromone level of neighboring nodes according to a local diffusion rate. In one embodiment, the following pair of diffusion equations is used:

$$\left(\frac{d}{dt} + \gamma_{vap}\right) T(x, y) = 0$$

$$\left(\frac{d}{dt} - \gamma_{diff} \nabla\right) P(x, y) = \gamma_{vap} T(x, y)$$

where $\gamma_{vap}$ and $\gamma_{diff}$ are constants denoting predetermined evaporation and diffusion rates, and T is the pheromone level on the route and a particular location (x, y); P is the density of evaporated pheromone, and $\nabla P$ is the gradient of P at location (x, y).

From time to time, the node receives an agent packet, step 520, and in response, the contents of the agent packet are accessed in order to determining the appropriate action to take, step 530. In one embodiment, accessing the agent packet contents involves unpacking the packet to obtain software instructions and associated data, that when processed provides, among other things, the state or status of the agent packet, any included reporting criteria, and the destination of the agent packet. Preferably, the software instructions contained in the agent packet are self-extractable and execute on the sensor node so that the impact of the agent packet on the sensor node is primarily determined by the contents of the agent packet. The inclusion of intelligence within the agent packet increases the flexibility of the system and data collection procedures and is a significant aspect of the present invention.

The action taken ordinarily depends upon the state of the agent packet in conjunction with the state of the node. In a first mode, the agent packet contents indicate that the agent packet is destined for the base node, as is the case when the agent packet has reporting data being routed to the base node. In such case, one of the neighbor nodes of the network is selected based on the route suitability or pheromone level associated with that node, and the agent packet is forwarded to this neighbor node, steps 540, 542. Additionally, the route suitability level of the instant sensor node is updated to reflect usage of the instant node as a route toward the base node, step 545. In other words, the pheromone level at the instant node is strengthened or increased. In a second mode, a determination is made as to whether a local condition exists that meets the reporting criteria, such as specified by the contents of the agent packet, step 550. When such a condition exists, the agent packet is updated, step 552, with reporting data, and to indicate a state that the agent packet is destined for the base node; and the agent packet is forwarded to a neighbor node selected based on the route suitability level associated with that neighbor node, step 555. In a third mode, the agent packet contents indicate that the packet is in a roaming state and should continue in a roaming state, 560. In such case, the agent packet is forwarded to a neighbor node selected at random or through other selection means, 565.

In one embodiment, agent packets containing reporting data or other data destined for the base node are forwarded by the sensor node to multiple neighbor nodes. Here, pheromone levels are determined for multiple neighbor nodes and those with the highest pheromone level selected, i.e., those neighbor nodes having a high route suitability level when compared to the others are selected. Agent packets that are updated with data or that contain data destined for the base node are forwarded to the selected nodes in order to increase the likelihood of arrival at the base node. The base node is configured with the necessary logic and instructions to discard duplicate agent packets.

Figure 6:
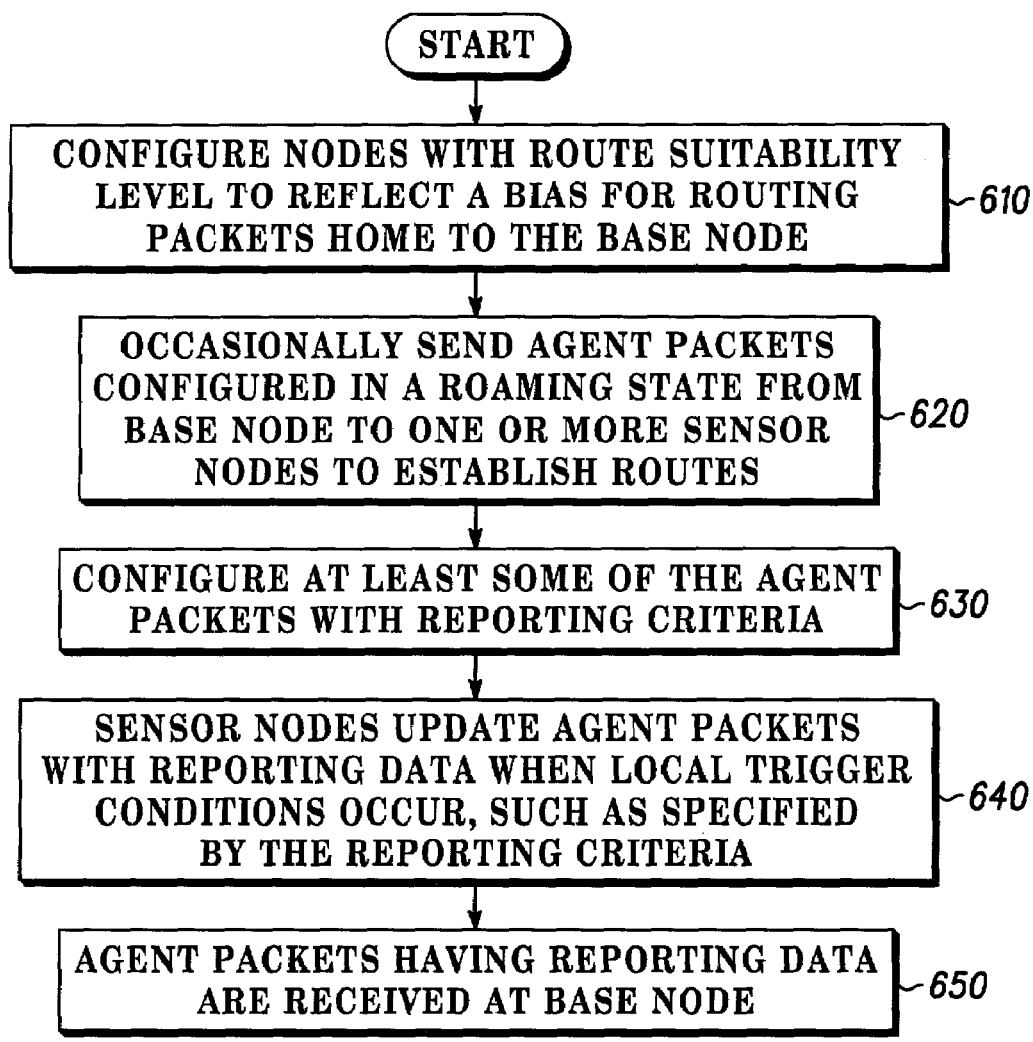
FIG. 6 shows a flowchart of procedures used in the administration of the sensor network, in accordance with the present invention.

FIG. 6 shows a flowchart of procedures used in the administration of the network, according to a preferred embodiment of the present invention. Upon network initialization, or in the event of a reset condition, the nodes of the network are configured with an initial pheromone or route suitability level, to reflect a particular bias for routing packets home to the base node, step 610. In one embodiment, the nodes are initially configured with a uniformed pheromone level. In another embodiment, those nodes that are closest to the base node are configured to have pheromone levels to reflect a particular home bias. Particularly, there is a preconfigured home bias for nodes assumed to have good routing capability for routing packets to the base node, such as those closest to the base node. The base node occasionally sends agent packets configured in a roaming state to one or more of the sensor nodes, such as those sensor nodes that are in the neighbor list stored in memory, step 620. The interaction between the agent packets and the nodes establishes routes back to the base node. Some or all of the agent packets sent out by the base node are configured with reporting criteria for specifying a localized trigger condition for data reporting by a sensor node, step 630. Sensor nodes update agent packets with reporting data destined for the base node when a local trigger condition occurs at a sensor node, step 640. The agent packets so updated use routes previously established by other agent packets to carry data back to the base node. The base node receives the updated agent packets and processes or further routes the reporting data, step 650. Accordingly, the base node uses the agent packets to establish routes and to collect data from distributed nodes.

The network control techniques described are well-suited for monitoring local conditions at a sensor site using data collection or measuring apparatus controlled or operated at each node. Some examples of the type of distributed sensor network are systems to used monitor environmental conditions, process flows, and equipment, such as for lighting, sprinkler, and heating, ventilation, and air conditioning systems.

The present invention offers significant advantages over the prior art. By combining the use of intelligent agents to perform route discovery, and the use of a route suitability level maintained at each node according to recent usage and evaporation and diffusion techniques, a dynamic environment is created that emphasizes reliability in message delivery. Moreover, the use of intelligent agent packets to define reporting criteria, to collect reporting data, and to influence operation of the node through software instructions, provides for substantial flexibility in network operation.

While the above description is of the preferred embodiment of the present invention, it should be appreciated that the invention may be modified, altered, or varied without deviating from the scope and fair meaning of the following claims.

What is claimed is:

1. A method in a communication network having a data collector node and a plurality of sensor nodes that are distributed, the method comprising the steps of:
   occasionally sending agent packets configured in a roaming state from the collector node to at least some of the plurality of sensor nodes;
   occasionally updating a route suitability level at each node of the plurality of sensor nodes reflecting suitability of each node for routing agent packets toward the collector node;
   receiving an agent packet at a particular sensor node of the plurality of sensor nodes;
   taking action, at the particular sensor node, in response to receipt of the agent packet, including the steps of:
   (a) accessing contents of the agent packet;
   (b) when the agent packet contents indicate a state that the agent packet is destined for the collector node:
      b1) forwarding the agent packet to a neighbor node selected from the plurality of sensor nodes based on the route suitability level associated with the neighbor node;
      (b2) updating the route suitability level of the particular sensor node reflecting usage of the particular sensor node as a route toward the collector node; and
   (c) when the agent packet contents indicate that the agent packet should continue in roaming state, forwarding the agent packet to a neighbor node selected at random.

2. The method of claim 1, wherein the step of taking action further comprises the step of:
   (d) when a local condition exists that meets a reporting criteria:
      (d1) updating the agent packet with reporting data;
      (d2) causing the agent packet to indicate a state that the agent packet is destined for the collector node;
      (d3) forwarding the agent packet to a neighbor node selected based on the route suitability level associated with the neighbor node.

3. The method of claim 2, wherein the step (d) further comprises the step of determining that the local condition exists that meets the reporting criteria based at least in part on using the contents of the agent packet.

4. The method of claim 1, wherein the step of updating the route suitability level comprises the steps of increasing the route suitability level.

5. The method of claim 1, wherein the step of occasionally updating the route suitability level comprises the steps of applying an evaporation algorithm to reduce the route suitability level over time.

6. The method of claim 1, wherein the step of occasionally updating a route suitability level comprises the step of applying a diffusion algorithm to decrease the route suitability level based on the route suitability level of at least one neighbor node.

7. The method of claim 1, wherein step (b1) further comprises the steps of:
   determining the route suitability level for a plurality of neighbor nodes;
   selecting a set of neighbor nodes having a high route suitability level when comparing to that of others of the plurality of neighbor nodes; and
   forwarding the agent packet to multiple neighbor nodes from the set of neighbor nodes selected.

8. The method of claim 1, wherein step (a) comprises the steps of:
   unpacking the agent packet to obtain software instructions; and
   locally executing the software instructions.

9. A method in a communication network having a plurality of distributed communication nodes and a base node, wherein the base node occasionally sends agent packets configured in a roaming state to at least some of the plurality of communication nodes, and accepts data in agent packets returned to the base node, the method comprising the steps of, at a particular node selected from the plurality of communication nodes:
   maintaining a route suitability level reflecting suitability of the particular node for routing packets toward the base node;
   receiving an agent packet;
   taking action in response to receipt of the agent packet, including the steps of:
   (a) accessing contents of the agent packet;
   (b) when the agent packet contents indicate a state that the agent packet is destined for the base node,
      (b1) forwarding the agent packet to a neighbor node selected from the plurality of communication nodes based on the route suitability level associated with the neighbor node;
      (b2) increasing the route suitability level of the particular node reflecting usage of the particular node as a route toward the base node; and (c) when the agent packet contents indicate that the agent packet should continue in roaming state, forwarding the agent packet to a neighbor node selected at random from the plurality of communication nodes.

10. The method of claim 9, wherein the step of maintaining comprises the step of applying an algorithm to reduce the route suitability level over time.

11. The method of claim 9, wherein the step of maintaining comprises the step of applying a diffusion algorithm to decrease the route suitability level based on the route suitability level of at least one neighbor node.

12. The method of claim 9, wherein the step of taking action further comprises the step of,
   (d) when a local condition exists that meets a reporting criteria,
      (d1) updating the agent packet with reporting data;
      (d2) causing the agent packet to indicate a state that the agent packet is destined for the base node;
      (d3) forwarding the agent packet to a neighbor node selected from the plurality of communication nodes based on the route suitability level associated with the neighbor node.

13. The method of claim 12, wherein the step (d) further comprises the step of determining that the local condition exists that meets the reporting criteria based at least in part on using the contents of the agent packet.

14. The method of claim 9, wherein step (b1) further comprises the steps of:
   determining the route suitability level for a plurality of neighbor nodes;
   selecting a set of neighbor nodes having a high route suitability level when compared to that of others of the plurality of neighbor nodes; and
   forwarding the agent packet to multiple neighbor nodes from the set of neighbor nodes selected.

15. The method of claim 9, wherein step (a) comprises the steps of:
   unpacking the agent packet to obtain software instructions; and
   locally executing the software instructions.

16. Apparatus for operating within a communication network, comprising a communication node having:
   a transmitter;
   a receiver operable to receive an agent packet;
   a memory for storing:
      a local route suitability level, the route suitability level reflecting suitability for operating as a router for routing the agent packet toward a particular destination;
      operating instructions for accessing and routing agent packets, including instructions for routing the agent packet to a neighbor node selected based on the route suitability level associated with the neighbor node, and for increasing the local route suitability level upon performing a routing operation; and
      information including the route suitability level for neighbor nodes;
   a processor coupled to the memory, the receiver, and the transmitter, and responsive to receipt of an agent packet by the receiver to execute the operating instructions;
   wherein the memory of the communication node further comprises operating instructions for routing the agent packet to a randomly selected neighbor node based at least in part on the agent packet having a roaming state.

17. The apparatus of claim 16, wherein the memory further comprises an algorithm for reducing the route suitability level over time.

18. The apparatus of claim 17, wherein the memory further comprises an algorithm for applying a diffusion algorithm to decrease the local route suitability level based on the route suitability level of at least one neighbor node.

19. The apparatus of claim 16, wherein the communication node further comprises a sensor for measuring a local condition, and the memory further comprises operating instructions for updating the agent packet with reporting data when the local condition meets a reporting criterion.

20. The apparatus of claim 19, further comprising a base node having a transmission mode for transmitting agent packets configured with a roaming state to a plurality of communication nodes, and to receive the agent packets containing reporting data.

21. A sensor network, comprising:
   a base node having a transmission mode for transmitting agent packets configured with a roaming state to a plurality of communication nodes, and to receive the agent packets containing reporting data, the agent packets having self-extracting software and data that specify reporting criteria for environmental conditions;
   a plurality of distributed sensor nodes having communication links there between, each sensor node comprising:
      a sensor for measuring at least one environmental parameter;
      a transmitter;
      a receiver operable to receive the agent packet,
      a memory for storing:
         a local route suitability level, the route suitability level reflecting suitability for operating as a router for routing the agent packet toward a particular destination;
         operating instructions for maintaining the local route suitability level, including instructions for:
            increasing the local route suitability level upon performing a routing operation;
            decreasing the local route suitability level according to an algorithm incorporating a local evaporation rate and a local diffusion rate;
         operating instructions for routing the agent packets, including instructions for:
            routing the agent packet to a neighbor node selected based on the route suitability level associated with the neighbor node when the agent packet contains data destined for the base node;
            routing the agent packet to the neighbor node selected when the agent packet is in a roaming state and the route suitability level associated with the neighbor node is above a certain threshold;
            routing the agent packet to the neighbor node selected at random when the agent packet is in a roaming state and the route suitability levels associated with the neighbor nodes are below a certain threshold;
         operating instructions for extracting software and data contained in an agent packet, and for determining whether a local condition exist that meet a reporting criteria defined at least in part by the software and data;
      a processor coupled to the sensor, the memory, the receiver, and the transmitter, and responsive to receipt of the agent packet by the receiver to execute the operating instructions.

22. A method in a communication network having a plurality of nodes including a base node having a data collection function, the method comprising the steps of, at a particular node selected from the plurality of nodes:

maintaining a route suitability level based on an evaporation and a diffusion constant, wherein the route suitability level reflects suitability of the particular node for routing agent packets toward the base node;

wherein the step of maintaining a route suitability level comprises the steps of applying an evaporation algorithm to reduce the route suitability level over time;

wherein the step of maintaining a route suitability level comprises the step of applying a diffusion algorithm to decrease the route suitability level based on the route suitability level of at least one neighbor node;

receiving an agent packet;

updating the agent packet with reporting data when the agent packet contains reporting criteria, and a local condition exists that meets the reporting criteria; and forwarding the agent packet toward the base node via a neighbor node selected from the plurality of nodes based on the route suitability level associated with the neighbor node, when the agent packet has data destined for the base node.

23. The method of claim 22, further comprising the step of forwarding the agent packet to a neighbor node selected at random from the plurality of nodes, when the agent packet has no data destined for the base node.

* * * * *